United States Patent [19]

Uranaka et al.

[11] 4,321,793

[45] Mar. 30, 1982

[54] INTEGRATED HYDRAULIC CIRCUIT FOR OFF HIGHWAY WORK VEHICLES

[75] Inventors: Kyoji Uranaka; Yasumasa Tarumizu, both of Kawasaki; Hideo Hara, Tokyo; Masaaki Ichimura, Kawasaki, all of Japan

[73] Assignee: Kabushiki Kaisha Komatsu Seisakusho, Tokyo, Japan

[21] Appl. No.: 107,318

[22] Filed: Dec. 26, 1979

[30] Foreign Application Priority Data

Dec. 25, 1978 [JP] Japan .............................. 53/158676
Dec. 28, 1978 [JP] Japan .............................. 53/161091

[51] Int. Cl.³ ..................... F01M 1/02; F15B 13/06; F15B 21/04; F16D 33/02
[52] U.S. Cl. ..................................... 60/358; 60/422; 60/456; 60/DIG. 3; 60/DIG. 5
[58] Field of Search ................. 60/330, 337, 339, 358, 60/422, 456, DIG. 3, DIG. 5; 91/514, 516; 188/264 B, 264 D, 264 P, 264 E; 192/113 B

[56] References Cited

U.S. PATENT DOCUMENTS

| | | | |
|---|---|---|---|
| 3,101,815 | 8/1963 | Thompson et al. | 188/264 E |
| 3,987,874 | 10/1976 | Fuehrer et al. | 188/264 E |
| 4,175,647 | 11/1979 | Hanke | 188/264 B |
| 4,209,985 | 7/1980 | Master | 60/DIG. 5 |
| 4,215,720 | 8/1980 | Belker | 91/516 |

Primary Examiner—Irwin C. Cohen
Attorney, Agent, or Firm—Armstrong, Nikaido, Marmelstein & Kubovcik

[57] ABSTRACT

A pair of pumps deliver pressurized fluid to a steering control valve assembly controlling the operation of a steering cylinder. The steering control valve assembly diverts any excess of the incoming pressurized fluid to a hoist control valve assembly controlling the operation of a pair of implement hoist cylinders. The hoist control valve assembly also diverts any excess of the incoming fluid away from the hoist cylinder pair, this time to a retarder or brake system for cooling same. The retarder receives additional cooling fluid from a hydraulic torque converter, to which the fluid has been forced from another pump. On leaving the retarder the pressurized fluid is cooled and then delivered to a transmission lubricating circuit.

6 Claims, 2 Drawing Figures

INTEGRATED HYDRAULIC CIRCUIT FOR OFF HIGHWAY WORK VEHICLES

BACKGROUND OF THE INVENTION

1. Field of the Invention

Our invention pertains to hydraulic circuits for off-highway self-propelled work machines such as construction and industrial vehicles. More particularly our invention concerns an integrated hydraulic power circuit or system for work vehicles of the type comprising a hydraulic power steering system, a hydraulic torque converter, a hydraulic fluid-cooled retarder or brake system, and a hydraulic implement actuator or actuators.

2. Description of the Prior Art

The work vehicles of the type under consideration usually have two independent hydraulic circuits. One of these includes a power steering system, a brake cooling system, and an implement control system. The other incorporates a torque converter and transmission assembly. This known hydraulic power system consisting of two separate circuits has the following problems:

1. The power steering system wastes the incoming pressurized fluid, by directing same to a drain, when the steering control valve is not actuated.

2. The brake cooling system requires a constant supply of pressurized fluid from a large displacement pump or pumps, for proper cooling of the brake system.

3. The transmission lubricating circuit is fed from a single pump, which must therefore be also of sufficiently large displacement to feed the circuit by itself.

4. The two separate circuits of the power system demand their own oil coolers, one located dowstream of the brake cooling system and another located downstream of the torque converter.

5. The two separate circuits have respective filters, thereby increasing the cost and labor for maintenance.

6. The two separate circuits make the piping more complex and costly than does an integrated circuit.

SUMMARY OF THE INVENTION

It is therefore a primary object of our invention to integrate the hydraulic circuits of off-highway work vehicles into a single system and thus to overcome the above enumerated problems of the prior art.

Another object of our invention is to provide such an integrated hydraulic power system having but one reservoir from which the working fluid is drawn out and into which the used fluid is directly returned.

Summarized in brief, the integrated hydraulic power system in accordance with our invention includes first pump means (comprising a pair of pumps in a preferred embodiment) and second pump means. The first pump means delivers pressurized fluid to steering control valve means controlling the operation of steering actuator means. The steering control valve means has means for diverting away from the steering actuator means any excess of the incoming pressurized fluid that is not demanded by the steering actuator means. The thus diverted pressurized fluid is delivered to implement control valve means controlling the operation of implement actuator means. The implement control valve means is also adapted to divert away from the implement actuator means any excess of the incoming pressurized fluid that is not demanded thereby.

The second pump means delivers pressurized fluid to a hydraulic torque converter and thence to a retarder for cooling same. The retarder cooling circuit also receives the excess pressurized fluid from the implement control valve means. On leaving the retarder cooling circuit the pressurized fluid is further directed into a transmission lubricating circuit.

Thus the power system of our invention integrally incorporates the steering control circuit, the implement control circuit, the torque converter circuit, the retarder cooling circuit, and the transmission circuit. The integrated power system consumes significantly less horsepower than the prior art system with its two independent circuits, thus permitting the use of pumps of correspondingly reduced capacities. Further the integrated power system reduces the required numbers and sizes of oil coolers, filters and like auxiliary components and so enables easier and less costly maintenance thereof.

According to an additional feature of our invention, the integrated power system has only one reservoir, from which the first and the second pump means draw the working fluid and into which the used or drained fluid is directly returned. This single reservoir, which in practice can take the form of the usual transmission oil pan, helps to achieve substantial simplification of the power system configuration.

The above and other objects, features and advantages of our invention and the manner of attaining them will become more apparent, and the invention itself will best be understood, as the description proceeds, with reference had to the accompanying drawings showing some preferable embodiments of the invention.

DESCRIPTION OF THE PREFERRED EMBODIMENTS

Figure 1:
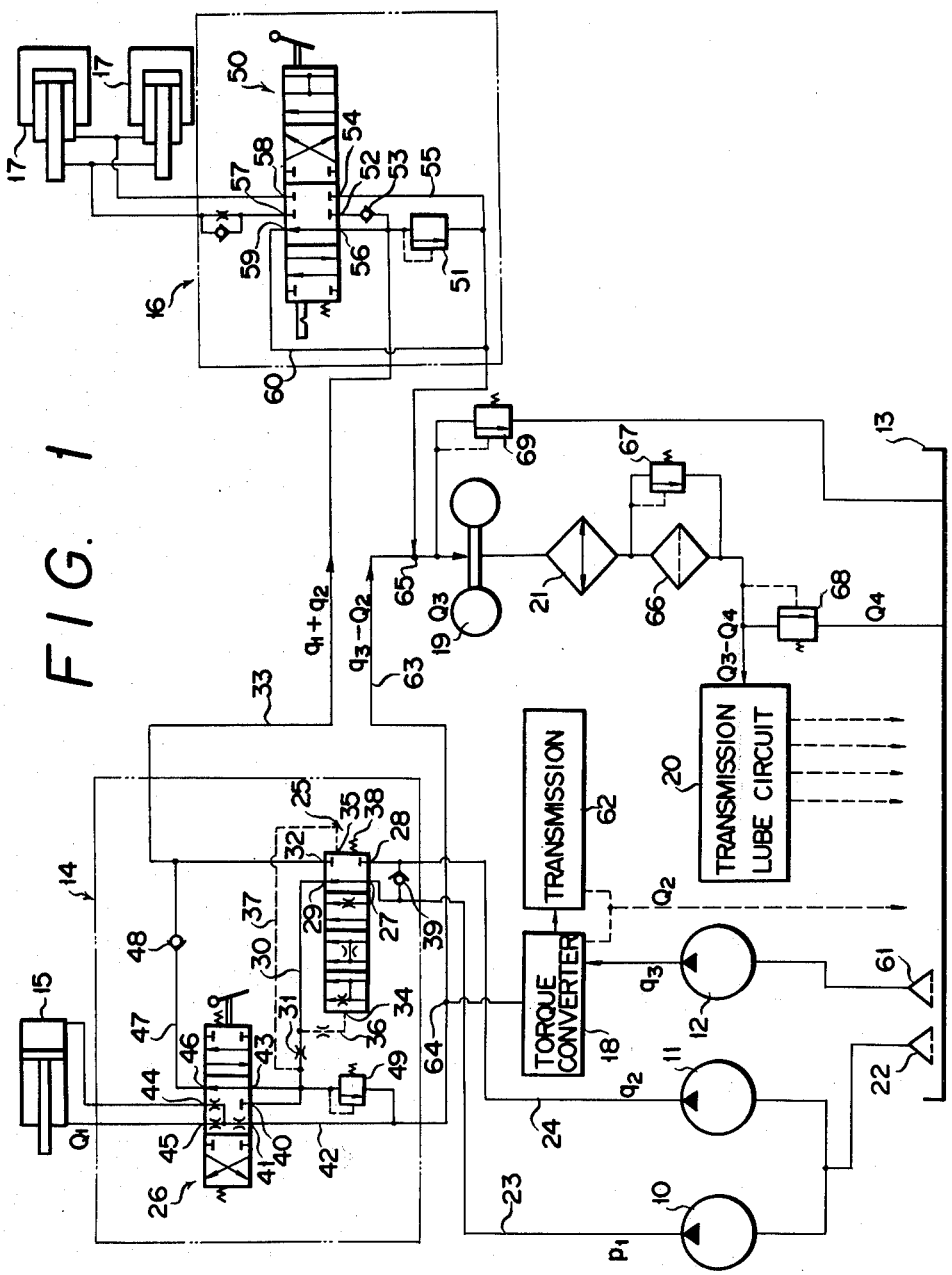
FIG. 1 is a diagrammatic representation, partly in block form, of a preferred form of the integrated hydraulic power system in accordance with our invention.

With reference to the above drawings, and first to FIG. 1 thereof, the first preferred form of the integrated hydraulic power system in accordance with our invention broadly comprises:

1. Three pumps 10, 11 and 12 for drawing a hydraulic fluid, usually oil, from a reservoir 13 and for pressurizing the fluid.

2. A steering control valve assembly 14 for controlling fluid pressure communication between the pumps 10 and 11 and a steering cylinder 15.

3. An implement hoist control valve assembly 16 for controlling the operation of a pair of implement hoist cylinders 17 by receiving pressurized fluid from the steering control valve assembly 14.

4. A hydraulic torque converter 18 receiving the pressurized fluid from the pump 12.

5. A retarder or brake system 19 to be cooled with the pressurized fluid delivered from both hoist control valve assembly 16 and torque converter 18.

6. A transmission lubricating circuit 20 receiving the pressurized fluid from the retarder 19 via a fluid cooler 21.

In this particular embodiment the reservoir 13 takes the form of a transmission oil pan, no other fluid receptacle being required. The pumps 10 and 11 draw the working fluid from the reservoir 13 via a common strainer or filter 22. The fluid outlets of these pumps 10 and 11 communicate with the steering control valve assembly 14 through respective pressure supply lines or conduits 23 and 24.

The steering control valve assembly 14 comprises a pilot-operated pressure compensator valve 25 and a manually operated steering control valve 26. Shown as a four-position valve, the pressure compensator valve 25 has: (1) a first pump port 27 open to the pressure supply line 23; (2) a second pump port 28 open to the pressure supply line 24; (3) a steering cylinder port 29 communicating with the steering control valve 26 by way of a line 30 having a restrictor 31; and (4) a hoist cylinder port 32 communicating with the hoist control valve assembly 16 by way of a line 33.

Further the pressure compensator valve 25 has two pilot ports 34 and 35 at its opposite ends. The pilot port 34 communicates with the upstream side of the restrictor 31 by way of a pilot line 36. The other pilot port 35 communicates with the downstream side of the restrictor 31 by way of a pilot line 37.

Normally retained in the illustrated extreme right hand position under the bias of a spring 38, the pressure compensator valve 25 shifts to the other three positions when the fluid pressure at the pilot port 34 defeats the resultant of the fluid pressure at the other pilot port 35 and the force of the biasing spring 38. A check valve 39 communicates between the two pressure supply lines 23 and 24, permitting fluid flow only from the latter to the former.

The steering control valve 26 is of three-position, six-port, discharge-center (ABR) configuration. The six ports of this valve 26 are: (1) a pressure port 40 communicating with the steering cylinder port 29 of the pressure compensator valve 25 by way of the pressure line 30; (2) a drain port 41 open to a line 42; (3) a bypass inlet port 43 also communicating with the steering cylinder port 29 of the pressure compensator valve 25; (4) a cylinder port 44 communicating with the head end chamber of the steering cylinder 15; (5) another cylinder port 45 communicating with the rod end chamber of the steering cylinder 15; and (6) a bypass outlet port 46 communicating with the line 33, leading to the hoist control valve assembly 16, by way of a line 47 having a check valve 48.

Normally spring-centered, the steering control valve 26 permits the pressurized fluid from the pressure compensator valve 25 to pass on to the hoist control valve assembly 16 by way of the bypass inlet 43 and outlet 46 ports and the lines 47 and 33. The steering control valve 26 on actuation communicates the pressure line 30 with either of the opposite fluid chambers of the steering cylinder 15. A relief valve 49 communicates between pressure line 30 and drain line 42 for relieving overpressure that may develop during communication of the pressure line with the steering cylinder 15.

The implement hoist control valve assembly 16 comprises a four-position, six-port hoist control valve 50 and a relief valve 51. The six-ports of the hoist control valve 50 are: (1) a pressure port 52 communicating with the pressure line 33 via a check valve 53; (2) a drain port 54 open to a line 55; (3) a bypass inlet port 56 communicating with the pressure line 33; (4) a cylinder port 57 communicating with the pair of implement hoist cylinders 17; (5) another cylinder port 58 communicating with the hoist cylinder pair 17; and (6) a bypass outlet port 59 open to a line 60 communicating with the drain line 55.

When in the illustrated normal position the hoist control valve 50 discommunicates the hoist cylinder pair 17 from the pressure line 33. The pressurized fluid from the steering control valve assembly 14 passes on to the line 60 by way of the bypass inlet 56 and outlet 59 ports. The hoist control valve 50 on actuation permits communication between the hoist cylinder pair 17 and the pressure line 33 and drain line 55. The relief valve 51 communicates between pressure line 33 and drain line 55 for relieving overpressure that may build up upon closure of the bypass inlet 56 and outlet 59 ports of the hoist control valve 50.

The pump 12 draws the working fluid from the reservoir 13 via a strainer or filter 61 and delivers the pressurized fluid to the hydraulic torque converter 18. The torque converter 18 communicates with the associated transmission 62 on the one hand and, on the other, with the cooling circuit of the retarder 19 by way of a line 63.

The torque converter discharge line 63 communicates at 64 with the drain line 42 of the steering control valve assembly 14 and at 65 with the drain line 55 and bypass line 60 of the hoist control valve assembly 16. Thus the fluid discharged or drained from all of the steering control valve assembly 14, the hoist control valve assembly 16, and the torque converter 18 is delivered to the cooling circuit of the retarder 19.

The cooling fluid outlet of the retarder 19 communicates with the transmission lubricating circuit 20 via the fluid cooler 21 and a filter 66. For operating safety the illustrated power system additionally includes: (1) a relief valve 67 communicating between the upstream and downstream sides of the filter 66; (2) another relief valve 68 communicating between the inlet of the transmission lubricating circuit 20 and the reservoir 13; and (3) still another relief valve 69 communicating between the upstream side of the retarder 19 and the reservoir 13.

OPERATION

Both pumps 10 and 11 deliver their pressurized fluid outputs q1 and q2 to the steering control valve assembly 14. The pressure compensator valve 25 of this valve assembly 14 directs both of these pumps outputs q1 and q2 to the steering cylinder port 29 when in the illustrated normal position. The pressure compensator valve 25 shifts as aforesaid to the successive ones of the other three positions when the fluid pressure on the upstream side of the restrictor 31 overcomes the resultant of the fluid pressure on the downstream side of the restrictor and the force of the biasing spring 38. By thus shifting to the successive positions to the left of its normal position the pressure compensator valve 25 decreases by degrees the fluid pressure directed toward the steering cylinder 15 and correspondingly increases the fluid pressure diverted away therefrom to the hoist control valve assembly 16.

The indicia Q1 designates the variable fluid pressure assigned to the steering cylinder 15. The pressure compensator valve 25 derives this steering fluid either from only the pump output q1 or from both of the pump outputs q1 and q2. The steering fluid Q1 flows to the steering cylinder 15 when the steering control valve 26 is actuated, and to the line 47 when this valve is unactuated. Thus, when the steering control valve 26 is in neutral, the steering control valve assembly 14 passes all of the pump outputs q1 and q2 on to the hoist control valve assembly 16 by way of the line 33. The fluid drained from the steering cylinder 15 flows to the torque converter discharge line 63 by way of the drain line 42.

When actuated the hoist control valve 50 of the hoist control valve assembly 16 utilizes all of the incoming fluid pressure for operating the hoist cylinder pair 17, although the relief valve 51 may act to bleed off any excess pressure to the drain line 55. The fluid drained from the hoist cylinder pair 17 flows to the torque converter discharge line 63 by way of the drain line 55. The hoist control valve 50 when in the illustrated normal position passes all of the incoming fluid on to the torque converter discharge line 63 by way of the bypass line 60.

The pressurized fluid from the pump 12 circulates through the hydraulic circuit of the torque converter 18 and thence partly flows into the transmission 62. The fluid leaking from the torque converter 18 and the transmission 62 returns directly to the transmission oil pan or reservoir 13. The thus leaking fluid is designated Q2.

The remainder, q3-Q2, of the pressurized fluid from the pump 12 flows from the torque converter 18 to the cooling circuit of the retarder 19 by way of the converter discharge line 63. The retarder cooling circuit also receives the fluid from the hoist control valve assembly 16. Let it be assumed that the steering cylinder 15 and the hoist cylinder pair 17 are now both inoperative. Then the pressurized fluid Q3 entering the cooling circuit of the retarder 19 can be defined as $$Q3 = q1 + q2 + q3 - Q2.$$

Should the pressure of this incoming fluid Q3 exceed a predetermined safe value, the relief valve 69 will act to bleed off the overpressure to the reservoir 13.

On leaving the retarder 19 the pressurized fluid is cooled by the cooler 21, then filtered by the filter 66, and then directed into the transmission lubricating circuit 20. The fluid pressure thus directed from the filter 66 to the transmission lubricating circuit 20 may be in excess of a preset value required for proper transmission lubrication. Thereupon the relief valve 68 opens to permit escape of the excess fluid Q4 to the reservoir 13. The rest, Q3-Q4, of the fluid from the filter 66 enters the transmission lubricating circuit 20 and thence falls down to the reservoir or transmission oil pan 13.

SECOND FORM

Figure 2:
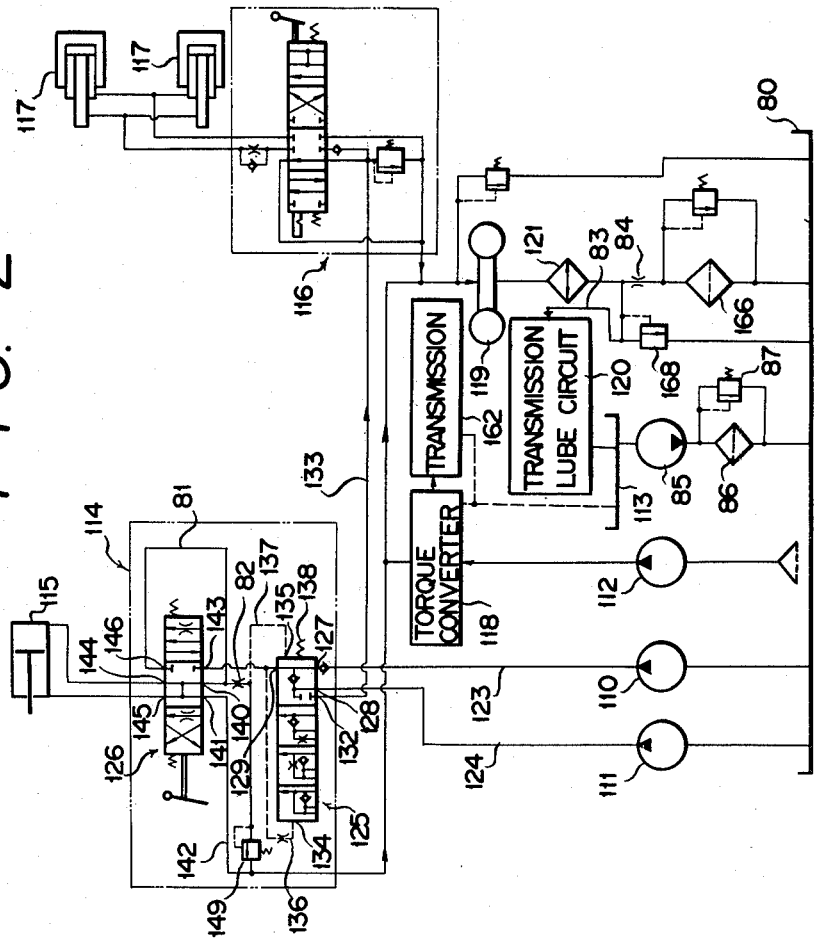
FIG. 2 is a similar representation of another preferred form of the integrated hydraulic power system.

Most parts, components and assemblies of the alternative embodiment shown in FIG. 2 have corresponding ones in the FIG. 1 embodiment. Such parts, components and assemblies will therefore be identified by the same reference numerals as used to denote the corresponding ones in the FIG. 1 embodiment, only with the digit 1 prefixed to such numerals. Parts or components newly introduced in this alternative embodiment will be designated by two-digit numbers from 80 upward.

The modified hydraulic power system of FIG. 2 also comprises three pumps 110, 111 and 112, a steering control valve assembly 114, an implement hoist control valve assembly 116, a hydraulic torque converter 118, a retarder 119, and a transmission lubricating circuit 120. The principal difference resides in a reservoir 80 separate from a transmission oil pan 113. The three pumps 110, 111 and 112 all draw the working fluid from the reservoir 80.

Although configured differently from the valve assembly 14 of the preceding embodiment, the steering control valve assembly 114 is identical in functions therewith, as will become apparent as the description progresses. The modified steering control valve assembly 114 comprises a four-position pressure compensator valve 125 and a three-position steering control valve 126.

The pressure compensator valve 125 has the following six ports: (1) a first pump port 127 communicating with the pump 110 by way of a line 123; (2) a second pump port 128 communicating with the pump 111 by way of a line 124; (3) a steering cylinder port 129 communicating with the steering control valve 126; (4) a hoist cylinder port 132 communicating with the hoist control valve assembly 116 by way of a line 133; (5) a pilot port 134 communicating with the steering cylinder port 129 by way of a pilot line 136; and (6) another pilot port 135 open to a pilot line 137. A biasing spring is shown at 138 for normally holding the pressure compensator valve 125 in the extreme right hand position.

The steering control valve 126 has the following six ports: (1) a pressure port 140 open to a line 81; (2) a drain port 141 open to a line 142; (3) another pressure port 143 communicating with the steering cylinder port 129 of the pressure compensator valve 125; (4) a cylinder port 144 communicating with the head end chamber of the steering cylinder 115; (5) another cylinder port 145 communicating with the rod end chamber of the steering cylinder 115; and (6) a pressure outlet port 146 communicating with the pressure port 140 by way of the line 81.

When spring centered, the steering control valve 126 has its pressure inlet port 143 and pressure outlet port 146 out of communication with each other. These ports 143 and 146 intercommunicate when the steering control valve 126 is actuated in either direction. The result is the flow of the pressurized fluid from the pressure compensator valve 125 to the pressure port 140 of the steering control valve 126 by way of the pressure line 81. The pressurized fluid flows from the pressure port 140 to either of the opposite fluid chambers of the steering cylinder 115.

A restrictor 82 and relief valve 149 are communicatively connected in series between pressure line 81 and drain line 142. The downstream side of the restrictor 82 further communicates with the pilot line 137 of the pressure compensator valve 125. Normally retained in the extreme right hand position under the bias of the spring 138, the pressure compensator valve 125 shifts to the successive ones of the other three positions upon increase of its steering cylinder port pressure in excess of the resultant of the fluid pressure on the downstream side of the restrictor 82 and the force of the biasing spring 138.

The pressure compensator valve 125 when in the normal position directs all of the pressurized fluid from the pumps 110 and 111 to the steering cylinder port 129. In the other three positions the pressure compensator valve 125 suitably apportions the incoming fluid pressures between steering cylinder port 129 and hoist cylinder port 132.

The hoist control valve assembly 116 for actuation of a pair of hoist cylinders 117 is exactly identical in construction with the hoist control valve assembly 16 of FIG. 1. The description of this valve assembly 116 will therefore be omitted.

Thus, as a consideration of FIG. 2 will reveal, the retarder 119 receives the pressurized cooling fluid from the steering control valve assembly 114, the hoist control valve assembly 116, and the torque converter 118. The fluid that has cooled the retarder 119 is then itself cooled by a cooler 121. The fluid outlet of the cooler 121 communicates on the one hand with the transmission lubricating circuit 120 by way of a line 83 having a relief valve 168 and, on the other hand, with the reservoir 80 via a restrictor 84 and filter 166. The noted transmission oil pan 113 is arranged to receive the fluid drained from the torque converter 118, transmission 162 and transmission lubricating circuit 120.

A scavenger pump 85 communicates between transmission oil pan 113 and reservoir 80 for returning the used fluid from the former to the latter. A filter 86 is communicatively connected downstream of the scavenger pump 85 for filtering the used fluid being returned to the reservoir 80. A relief valve 87 communicates between the upstream and downstream sides of the filter 86 for protecting same from overpressure.

The other details of construction and operation of this modified power system are believed apparent from the foregoing description of FIG. 1 taken in consideration of FIG. 2. It will also be seen that the steering control valve assembly 114 in this modified power system could be replaced by the steering control valve assembly 14 of FIG. 1.

While we have herein shown and described our invention in what we have conceived to be the preferable embodiments thereof, it will be easy for those skilled in the art to devise other forms to conform to system requirements or design preferences. Our invention is therefore not to be limited to the details disclosed herein but is to be accorded the full scope of the following claims so as to embrace any and all equivalent forms.

We claim:

1. An integrated hydraulic power system for off-highway self-propelled work machines, comprising:
   (a) first pump means for providing pressurized fluid;
   (b) steering actuator means;
   (c) steering control valve means communicating between the first pump means and the steering actuator means for controlling the operation of the latter;
   (d) the steering control valve means having means for diverting away from the steering actuator means any excess of the pressurized fluid from the first pump means that is not demanded by the steering actuator means;
   (e) implement actuator means;
   (f) implement control valve means communicating between the steering control valve means and the implement actuator means for controlling the operation of the latter by receiving the diverted pressurized fluid from the former, the implement control valve means being adapted to divert away from the implement actuator means any excess of the incoming pressurized fluid that is not demanded by the implement actuator means;
   (g) second pump means for providing pressurized fluid;
   (h) a hydraulic torque converter communicating with the second pump means for receiving the pressurized fluid therefrom;
   (i) a retarder communicating with the implement control valve means and with the torque converter for being cooled with the pressurized fluid received therefrom; and
   (j) a transmission lubricating circuit communicating with the retarder for receiving the pressurized fluid therefrom.

2. An integrated hydraulic power system according to claim 1, wherein the first and the second pump means draw the fluid from a common reservoir, and wherein the reservoir directly receives the used fluid from the transmission lubricating circuit.

3. An integrated hydraulic power system according to claim 1, further comprising:
   (a) a first reservoir from which the first and the second pump means draw the fluid;
   (b) a second reservoir for receiving the used fluid from the transmission lubricating circuit; and
   (c) means for returning the used fluid from the second reservoir to the first reservoir.

4. An integrated hydraulic power system according to claim 1, further comprising means for delivering to the retarder the fluid drained from the steering actuator means.

5. An integrated hydraulic power system according to claim 1, further comprising means for delivering to the retarder the fluid drained from the implement actuator means.

6. An integrated hydraulic power system according to claim 1, further comprising a fluid cooler communicating between the retarder and the transmission lubricating circuit for cooling the fluid.

* * * * *